May 13, 1952
H. L. GERWIN
2,596,142
SIGNAL GENERATOR
Filed Feb. 21, 1946
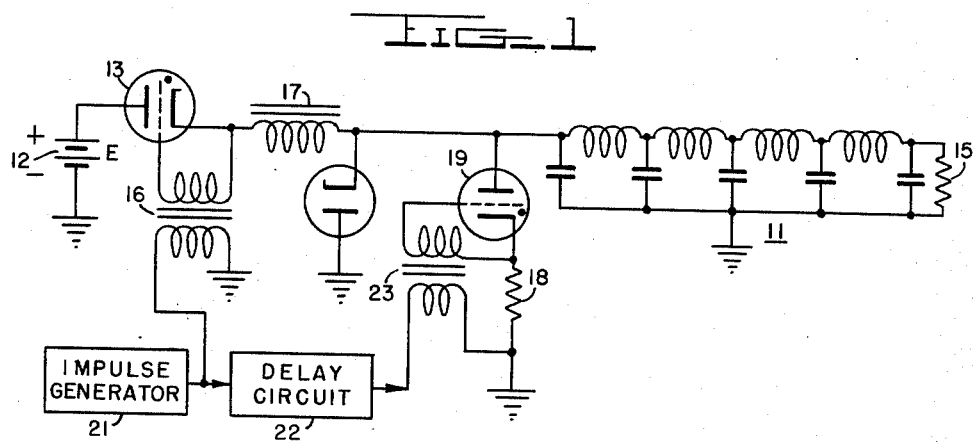
Inventor
HARRY L. GERWIN
By M. O. Hayes
Attorney Patented May 13, 1952

2,596,142

UNITED STATES PATENT OFFICE 2,596,142

SIGNAL GENERATOR

Harry L. Gerwin, United States Navy, Washington, D. C.

Application February 21, 1946, Serial No. 649,441

3 Claims. (Cl. 250—27)

(Granted under the act of March 3, 1883, as amended April 30, 1928; 370 O. G. 757)

This invention relates to signal generators and more particularly to apparatus for producing electrical impulses.

It is an object of the invention to provide apparatus for generating impulses having a constant amplitude irrespective of the time interval between successive impulses.

Another object of the invention is to provide means for sequentially producing electric impulses of uniform duration, amplitude and shape at random time intervals.

Other objects, features, and advantages of the invention will be apparent from the following description and the accompanying drawing in which;

Figure 1 is a schematic diagram of an exemplary form of the invention, and

Figures 2, 3, and 4 are wave forms illustrative of the operation of the invention.

The invention provides an energy storage device, a source of electric energy, means for transferring energy from the source to the device, means for discharging the energy of the device into a load, and means for maintaining constant the amount of energy transferred from the device to the load during each discharge of said device, irrespective of the time between successive discharges. The last named means comprises switching means connected between the energy source and the storage device, means for operating said switching means to connect said source to said device a predetermined time prior to discharge of the device. The invention thereby avoids the effects of energy loss through leakage in the storage device which would occur if the device were maintained in a charged condition for varying time intervals between successive discharges of the device.

Referring now to Figure 1, the storage device may comprise an artificial transmission line 11. The line 11 is charged from a source of electric energy which may be represented by a battery 12. The battery 12 is connected to switching means comprising a gas-filled space discharge tube 13 which is normally non-conductive. The switch tube 13 is made conductive upon the occurrence of a voltage impulse applied to the control element thereof through transformer 16. Subsequent to the initiation of conduction of current in tube 13 current flows through the tube 13 from the source 12 to the line 11 until the line becomes charged to a maximum value of voltage. The circuit of Figure 1 utilizes an inductance 17 for resonant charging of the line 11 whereby the voltage to which the line 11 is charged reaches a value substantially twice the potential E. of the battery 12. At the time the charge on the line 11 reaches its maximum value, the voltage across the switch tube 13 reaches a low value insufficient to maintain current flow through the tube. Thereafter, tube 13 remains non-conductive until the control element thereof receives a subsequent impulse. The line 11 is charged with the amount of energy transferred thereto from the battery 12. Consequently, a voltage exists across the line 11 corresponding to the amount of energy stored therein, said energy being stored in the dielectric.

However, a certain amount of leakage occurs through the dielectric and insulation of the line. The leakage circuit may be represented by an equivalent shunt resistance 15. Although, in a well constructed line, the leakage resistance 15 may be of a relatively high value the line 11 tends to discharge energy into the leakage resistance 15 resulting in a continuous decrease of voltage across the line 11.

In the present invention, the energy stored in the line 11 is discharged into a load after a predetermined time subsequent to the charging of the line 11. Thus, even though the line 11 is discharged at irregular intervals, the amount of energy delivered to the load during each discharge remains uniform.

For discharging the line 11 into a load represented by a resistance 18 a second switch tube 19 is rendered conductive by means of an impulse applied to the control element thereof after a constant predetermined delay subsequent to the initiation of conduction in tube 13. The impulses initiating conduction in tubes 13 and 19 may be derived from an impulse generator 21 which delivers electrical impulses to transformer 16 for initiating conduction in tube 13 and to a delay circuit 22 for subsequent delivery of the impulses to transformer 23 for initiation of conduction in tube 19.

The switch tubes 13, 19 preferably are of type which require zero bias on their respective control elements to maintain the tubes non-conductive. Otherwise, negative bias must be provided for the tubes 13, 19.

A diode 24 serves to damp oscillations which may occur during discharge of the line 11 by providing a high conductance path for the negative portions of the oscillation.

Figure 2 is a plot of voltage versus time for the impulses utilized for initiation of conduction of current through tubes 13 and 19. The impulses denoted $a_1$, $a_2$ etc., are produced by the impulse generator 21 and applied to the control element of switch tube 13 to initiate conduction therein. The impulses denoted b1, b2, etc., constitute the output of the delay circuit 22 and are applied to the control element of tube 19 to initiate conduction of current therein.

Figure 3 illustrates the voltage across the line 11 which builds up to a value E', substantially twice the voltage of the battery 12. The subsequent discharge of the line 11 effects a drop of the voltage across the line 11 to a value E'/2, where it remains until the line 11 is completely discharged. At the end of the discharge cycle, the line voltage remains at zero until the initiation of a subsequent cycle of operation.

In Figure 4, the impulses developed across the load resistance 18 are shown. It will be noted that although the impulses occur at irregular time intervals, their amplitudes are substantially uniform.

While I have illustrated and described one embodiment of my invention, it will be apparent that modifications may be made within the scope of my invention as defined in the appended claims.

The invention described herein may be manufactured and used by or for the Government of the United States of America for governmental purposes without the payment of any royalties thereon or therefor.

What is claimed is:

1. A signal generator comprising an energy storage device, a source of electric current for charging said storage device, a first gas-filled space discharge device connected in series with said source and said storage device, means for initiating conduction of current through said first discharge device, a terminating impedance for said storage device, a second gas-filled space discharge device for discharging said storage device through said terminating impedance upon initiation of conduction of current through said second discharge device, and delay circuit means coupled to the first named means for initiating conduction through said second discharge device after a predetermined time interval subsequent to the initiation of conduction through said first discharge device.

2. A signal generator comprising an artificial transmission line, a source of electric current for charging said line, a first discharge device connected for conduction of current through said device from said source to said line, means for initiating conduction through said first discharge device, a terminating impedance for said line, a second gas-filled space discharge device for discharging said line through said impedance upon initiation of conduction through said second discharge device, and delay circuit means coupled to the first named means for initiating conduction through said second device after a predetermined time subsequent to the initiation of conduction through said first discharge device.

3. A signal generator comprising an artificial transmission line, a source of electric current, an inductance, a first gas-filled space discharge device, means for initiating conduction of current through a series circuit comprising said source, said first discharge device and said line, whereby resonant charging of the line may be effected, a terminating impedance substantially equal to the characteristic impedance of said line, a second gas-filled space discharge device coupled to said transmission line for discharging said line through said impedance upon initiation of current conduction through said second discharge device, and delay circuit means coupled to the first named means for initiating conduction through said second discharge device after a predetermined time interval subsequent to the initiation of conduction through said series circuit.

HARRY L. GERWIN.

REFERENCES CITED

The following references are of record in the file of this patent:

UNITED STATES PATENTS

| Number | Name | Date |
|--------|------|------|
| 2,405,069 | Tonks | July 30, 1946 |
| 2,409,897 | Rado | Oct. 22, 1946 |
| 2,470,895 | Marlowe | May 24, 1949 |
| 2,543,445 | Doolittle | Feb. 27, 1951 |